US012620063B2

(12) United States Patent
    Wang

(10) Patent No.: US 12,620,063 B2
(45) Date of Patent: May 5, 2026

(54) IMAGE GENERATION DEVICE, AUTONOMOUS CLEANER AND IMAGE GENERATION METHOD

(71) Applicant: PixArt Imaging Inc., Hsin-Chu City (TW)

(72) Inventor: Guo-Zhen Wang, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 243 days.

(21) Appl. No.: 18/537,827

(22) Filed: Dec. 13, 2023

(65) Prior Publication Data

US 2025/0200709 A1    Jun. 19, 2025

(51) Int. Cl.
    G06T 5/50        (2006.01)
    G06T 3/4053      (2024.01)
    G06T 7/50        (2017.01)
(52) U.S. Cl.
    CPC .............. G06T 5/50 (2013.01); G06T 3/4053 (2013.01); G06T 7/50 (2017.01); G06T 2207/20221 (2013.01)

(58) Field of Classification Search
    None
    See application file for complete search history.

(56) References Cited

U.S. PATENT DOCUMENTS

| | | | |
|---|---|---|---|
| 2019/0243369 A1* | 8/2019 | Wang ................... | A47L 9/2889 |
| 2023/0012208 A1* | 1/2023 | Nakamura ........... | H04N 23/959 |
| 2025/0299350 A1* | 9/2025 | Guizilini .............. | G01S 13/867 |
| 2025/0317540 A1* | 10/2025 | Simek .................. | H04N 13/232 |

* cited by examiner

*Primary Examiner* — James A Thompson
(74) *Attorney, Agent, or Firm* — Winston Hsu

(57) ABSTRACT

An image generation device, for generating an output image with first absolute depth information, comprising: at least one image sensor, configured to generate at least one first image with a first resolution and at least one second image with a second resolution, wherein the first image does not have depth information and the second image has second absolute depth information, wherein the first resolution is higher than the second resolution; and a processing circuit, configured to use a depth estimation engine to generate at least one third image with a third resolution according to the first image, wherein the third image has relative depth information; wherein the processing circuit further uses a fusion engine to fuse the second image and the third image to generate the output image.

20 Claims, 5 Drawing Sheets

IMAGE GENERATION DEVICE, AUTONOMOUS CLEANER AND IMAGE GENERATION METHOD

BACKGROUND OF THE INVENTION

1. Field of the Invention

The present invention relates to an image generation device, an autonomous cleaner and an image generation method, and particularly relates to an image generation device, an autonomous cleaner and an image generation method which can reduce the computation effort and cost of images with absolute depth information.

2. Description of the Prior Art

As technology advances, an autonomous cleaner (e.g., a robot cleaner) may have a 3D depth sensor which generates images with absolute depth information. The autonomous cleaner may use the images to determine a location thereof and surrounding environments. However, the 3D depth sensor is always expensive thus increases a cost of the autonomous cleaner. Additionally, the computation of the 3D depth sensor is complicated, thus a frame rate or a resolution of the images with absolute depth information may be low, which may cause wrong distance determination while the autonomous cleaner is moving fast.

SUMMARY OF THE INVENTION

One objective of the present invention is to provide an image generation device which can reduce the computation effort and cost of images with absolute depth information.

Another objective of the present invention is to provide an autonomous cleaner which can reduce the computation effort and cost of images with absolute depth information.

Still another objective of the present invention is to provide an image generation method which can reduce the computation effort and cost of images with absolute depth information.

One embodiment of the present invention discloses an image generation device, for generating an output image with first absolute depth information, comprising: at least one image sensor, configured to generate at least one first image with a first resolution and at least one second image with a second resolution, wherein the first image does not have depth information and the second image has second absolute depth information, wherein the first resolution is higher than the second resolution; and a processing circuit, configured to use a depth estimation engine to generate at least one third image with a third resolution according to the first image, wherein the third image has relative depth information; wherein the processing circuit further uses a fusion engine to fuse the second image and the third image to generate the output image.

Another embodiment of the present invention discloses an autonomous cleaner, comprising an image generation device and a control circuit. The image generation device, which is for generating an output image with first absolute depth information, comprises: at least one image sensor, configured to generate at least one first image with a first resolution and at least one second image with a second resolution, wherein the first image does not have depth information and the second image has second absolute depth information, wherein the first resolution is higher than the second resolution; and a processing circuit, configured to use a depth estimation engine to generate at least one third image with a third resolution according to the first image, wherein the third image has relative depth information; wherein the processing circuit further uses a fusion engine to fuse the second image and the third image to generate the output image. The control circuit controls operations of the autonomous cleaner according to the first absolute depth information.

Still another embodiment of the present invention discloses an image generation method, for generating an output image with first absolute depth information, comprising: generating at least one first image with a first resolution and at least one second image with a second resolution, wherein the first image does not have depth information and the second image has second absolute depth information, wherein the first resolution is higher than the second resolution; using a depth estimation engine to generate at least one third image with a third resolution according to the first image, wherein the third image has relative depth information; and using a fusion engine to fuse the second image and the third image to generate the output image.

In view above-mentioned embodiments, the distance determination can keep accurate while the computation effort and cost of images with absolute depth information are reduced.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be performed by programs stored in a non-transitory computer readable recording medium by a processing circuit. The non-transitory computer readable recording medium can be, for example, a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Figure 1:
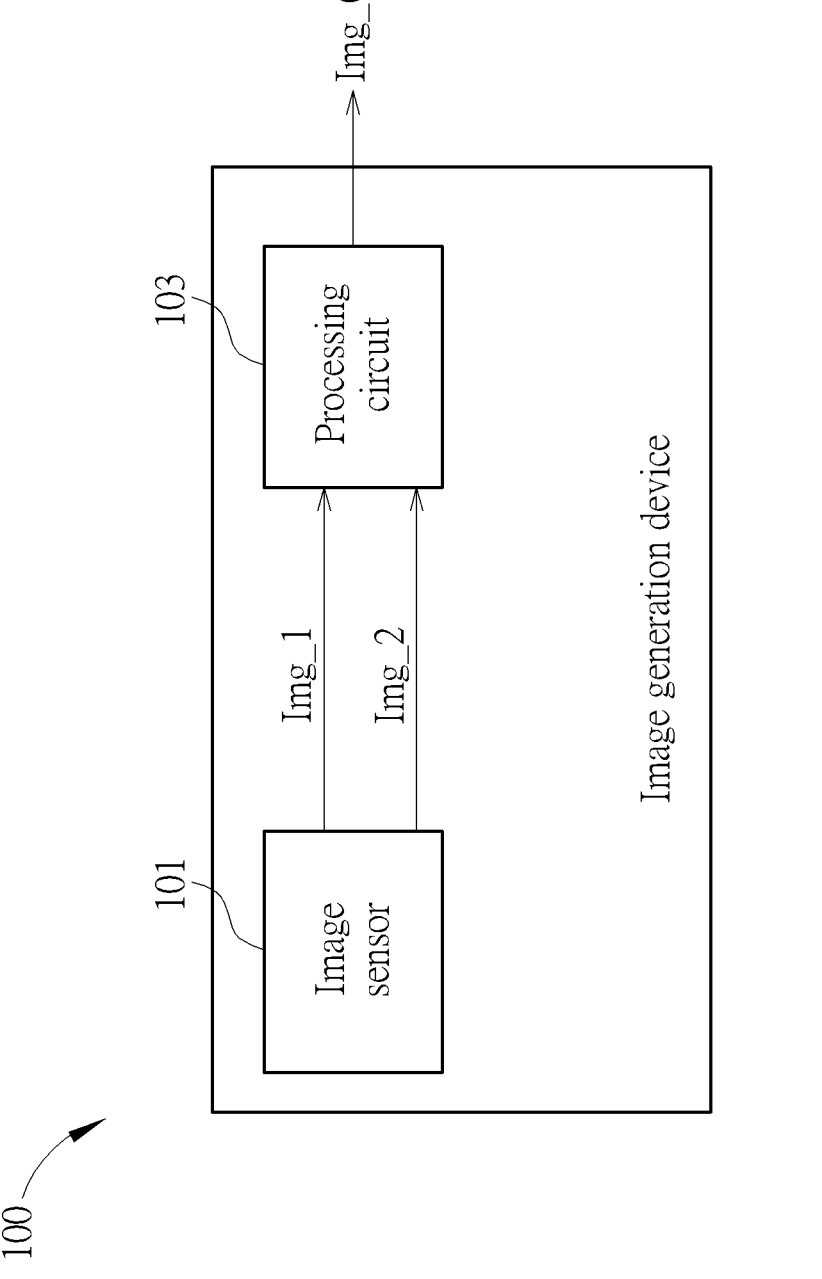
FIG. 1 is a block diagram illustrating an image generation device according to one embodiment of the present invention.

FIG. 1 is a block diagram illustrating an image generation device 100 according to one embodiment of the present invention. As illustrated in FIG. 1, the image generation device 100 is configured to generate an output image Img_O with first absolute depth information. As shown in FIG. 1, the image generation device 100 comprises an image sensor 101 and a processing circuit 103. At least a portion of the processing circuit 103 may be integrated to the image sensor 101.

The image sensor 101 is configured to generate at least one first image Img_1 with a first resolution and at least one second image Img_2 with a second resolution. In one embodiment, the image sensor 101 is a SPAD (Single Photon Avalanche Diode) sensor. The first image Img_1 does not have depth information and the second image Img_2 has second absolute depth information. In other words, the first image Img_1 may be a conventional image sensed by a conventional image sensor. The first resolution is higher than the second resolution. Please note, in one embodiment, the first image Img_1 and the second image Img_2 may be generated by two different image sensors rather than a single image sensor.

Please note, the output image Img_O has the first absolute depth information but the second image Img_2 has second absolute depth information, thus the output image Img_O and the second image Img_2 has different depth information. For more detail, the second image Img_2 has the second absolute depth information which is generated by the image sensor 101, but the output image Img_O has the first absolute depth information which is generated by the processing circuit 103.

The processing circuit 103 is configured to use a depth estimation engine to generate at least one third image (not shown in FIG. 1) with a third resolution according to the first image Img_1. The third image has relative depth information. The processing circuit 103 further uses a fusion engine to fuse the second image Img_2 and the third image to generate the output image Img_O.

The absolute depth information and the relative depth information have different meanings. In one embodiment, the absolute depth information may have information for real distances. For example, the absolute depth information may comprise the information that a wall is away from the image generation device 100 for 15 cm. On the opposite, the relative depth information may have no information for real distances, but have information for relative distances. For example, the relative depth information may have the information that an obstacle is close to the image generation device, or two obstacles in front of the image generation device are close.

Figure 2:
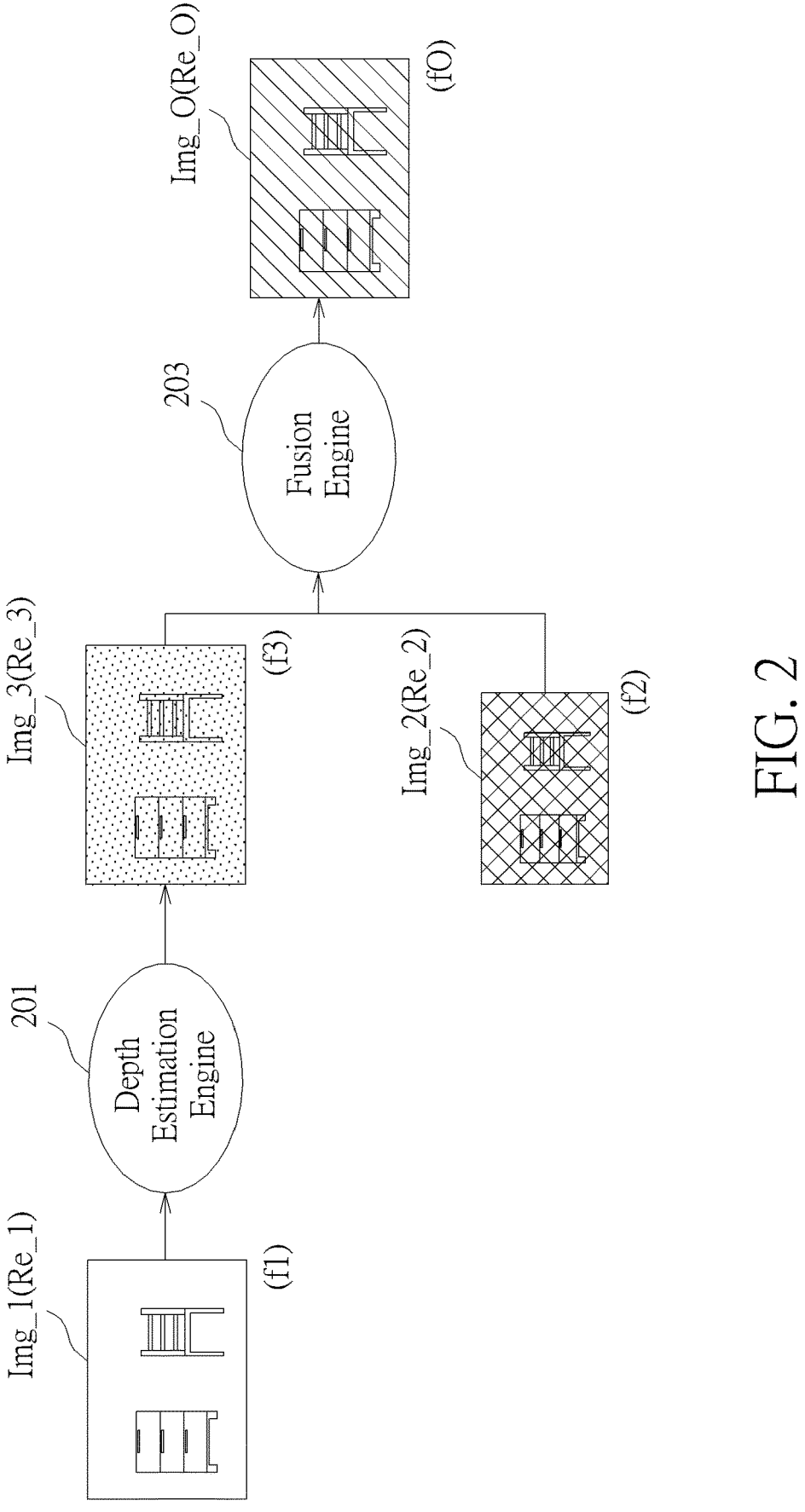
FIG. 2 is a schematic diagram illustrating detail operations of the image generation device shown in FIG. 1, according to one embodiment of the present invention.

Detail operations of the image generation device 100 will be described below. FIG. 2 is a schematic diagram illustrating detail operations of the image generation device 100 shown in FIG. 1, according to one embodiment of the present invention. Pleas also refer to FIG. 1 while referring to FIG. 2, to understand the concepts of the present invention for more clarity.

As shown in FIG. 2, the first image Img_1 is processed by the depth estimation engine 201 to generate the third image Img_3. Next, the third image Img_3 and the second image Img_2 are processed by the fusion engine 203 to generate the output image Img_O. In one embodiment, the depth estimation engine 201 applies deep-learning based monocular depth estimation, which may be regarded as AI (Artificial Intelligence) depth estimation, such as ZoeDepth, VPD, AIT-P, DINOv2 or NVDS. Also, the fusion engine 203 may use rule-based algorithm or AI to fuse the second image Img_2 and the third image Img_3. In one embodiment, the fusion engine 203 compares similar or identical features of the second image Img_2 and the third image Img_3, to accordingly fuse the second image Img_2 and the third image Img_3 to generate the output image Img_O. In other words, the fusion engine 203 refers the relative depth information contained in the third image Img_3 and the second absolute depth information contained in the second image Img_2, to generate the first absolute depth information contained in the output image Img_O.

In one embodiment, the accuracy of the second absolute depth information is lower than the first absolute depth information, since the first absolute depth information is generated by the image sensor 101 but the second absolute depth information is generated by processing the second image Img_2 and the third image Img_3. However, even in such case, the second absolute depth information maybe still accuracy enough for some applications, such as the distance determination.

As above-mentioned, the first image Img_1 has a first resolution Re_1, the second image Img_2 has a second resolution Re_2 and the third image Img_3 has a third resolution Re_3. Also, the output image Img_O has an output resolution Re_O. In one embodiment, the first resolution Re_1, the third resolution Re_3 and the output resolution Re_O are all 320×240, and the second resolution Re_2 is 80×60. Accordingly, the following relations can be acquired: The first resolution Re_1 is higher than the second resolution Re_2, the third resolution Re_3 is higher than the second resolution Re_2, the output resolution Re_O is higher than the second resolution Re_2, and the output resolution Re_O is equal to the third resolution Re_3. In such example, the computation complexity of a whole image generation device 100 is reduced since the second image Img_2 which needs more computation has a lower resolution. However, the distance computation can still be accurate since the output image Img_O has a high resolution. Further, costs of the image sensor which can generate images with absolute depth information and low resolutions are lower.

Further, the first image Img_1, the second image Img_2, the third image Img_3 and the output image Img_O respectively have a first frame rate f1, a second frame rate f2, a third frame rate f3 and an output frame rate fO. In one embodiment, the first frame rate f1, the second frame rate f2, the third frame rate f3 and the output frame rate fO are respectively 120 fps, 40 fps, 60 fps and 30 fps. The output frame rate fO may be 40 fps in another embodiment.

Accordingly, following relations can be acquired: The first frame rate f1 is higher than the second frame rate f2. The third frame rate f3 is higher than the second frame rate f2 and lower than the first frame rate f1. The output frame rate fO is lower than the third frame rate f3, and is lower than or equal to the second frame rate f2. In such example, the computation complexity of a whole image generation device 100 is reduced since the second image Img_2 which needs more computation has a lower frame rate.

Figure 3:
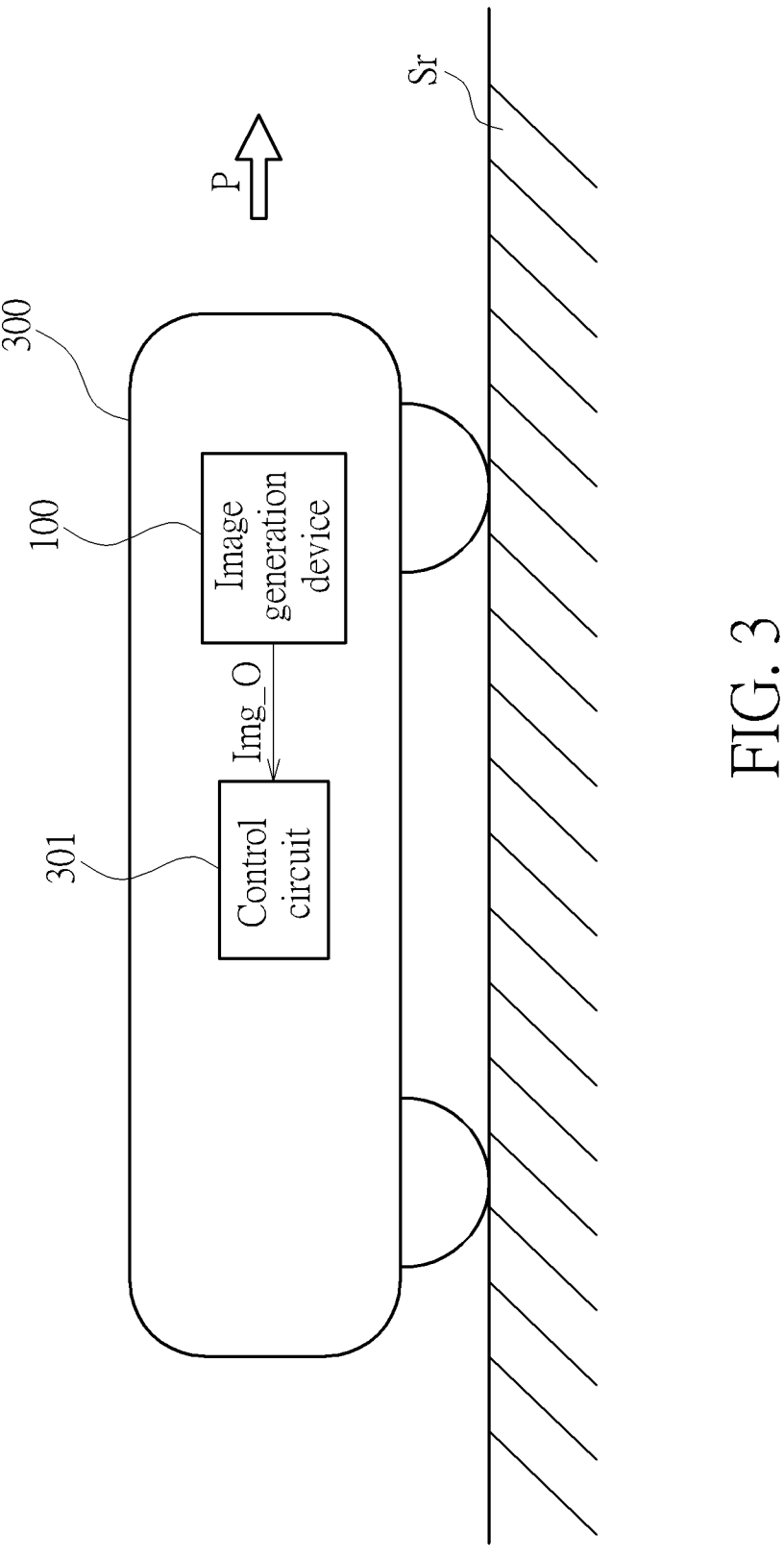
FIG. 3 is a schematic diagram illustrating an autonomous cleaner according to one embodiment of the present invention.

The above-mentioned image generation device 100 may be applied to an autonomous cleaner. FIG. 3 is a schematic diagram illustrating an autonomous cleaner 300 according to one embodiment of the present invention. As illustrated in FIG. 3, the autonomous cleaner 300 comprises the above image generation device 100 and a control circuit 301. At least a portion of the control circuit 301 may be integrated to the image generation device 100.

As shown in FIG. 3, the image generation device 100 senses the images in front of (the direction P) and accordingly generates the output image Img_O to the control circuit 301, following the above-mentioned steps. Thus, the control circuit 301 may acquire the first absolute depth information contained in the output image Img_O. Afterwards, the control circuit 301 controls the operations of the autonomous cleaner 300 according to the first absolute depth information. In one embodiment, the control circuit 301 may receive the first absolute depth information rather than the output image Img_O. In such case, the first absolute depth information may be generated by the image generation device 100 or another independent device.

Figure 4:
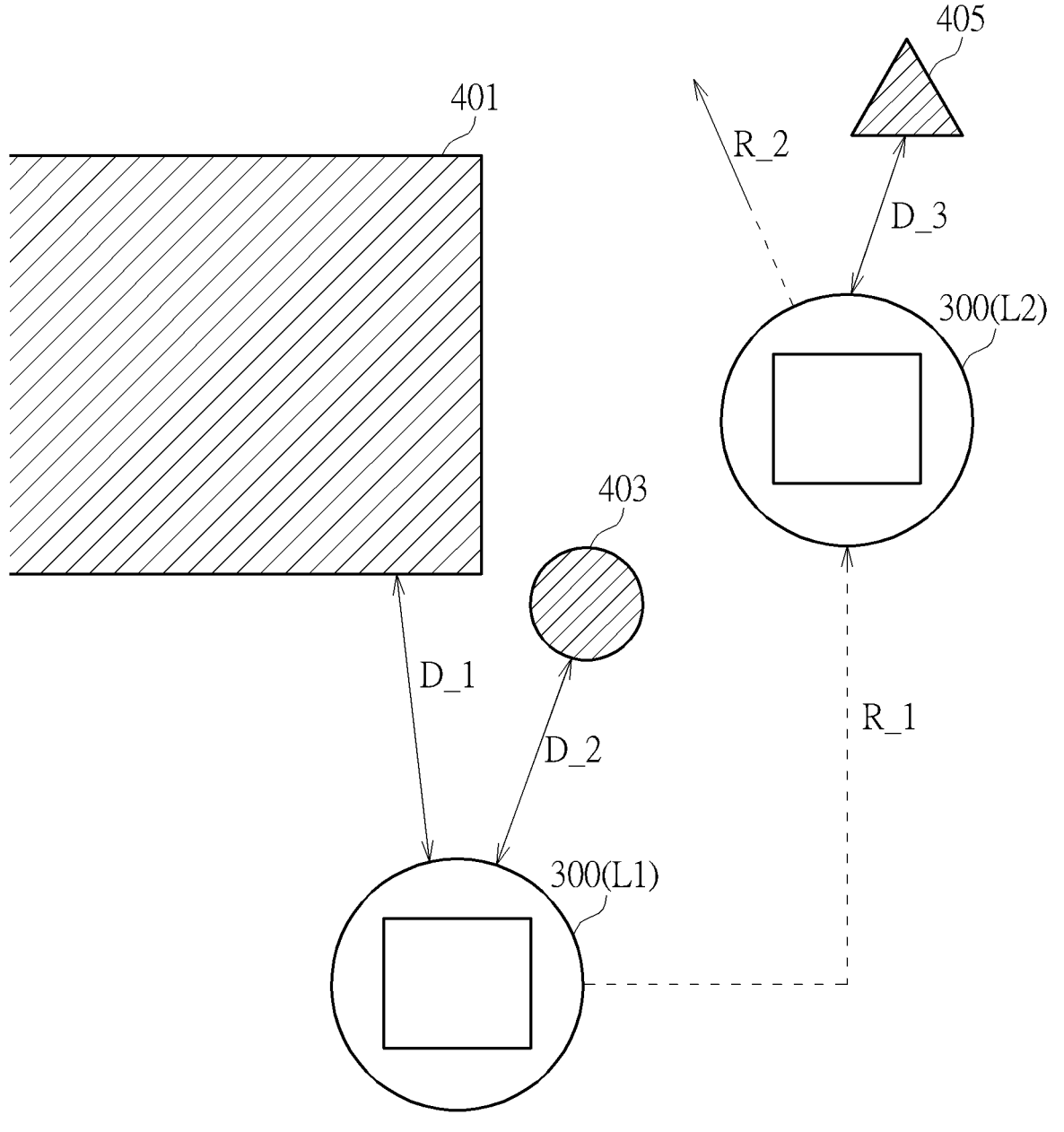
FIG. 4 is a schematic diagram illustrating operations of the autonomous cleaner according to one embodiment of the present invention.

FIG. 4 is a schematic diagram illustrating operations of the autonomous cleaner according to one embodiment of the present invention. As shown in FIG. 4, at the location L1, the autonomous vacuum cleaner 300 can determine that the distance between the wall 401 and itself is distance D 1 based on the first absolute depth information, and determine that the distance between the obstacle 403 and itself is distance D 2 based on the first absolute depth information. Accordingly, the autonomous cleaner 300 may choose the route R 1 to avoid the wall 401 and the obstacle 403. In the same manner, at the location L2, the autonomous vacuum cleaner 300 can determine that the distance between the obstacle 405 and itself is distance D_3 based on the first absolute depth information. Accordingly, the autonomous cleaner 300 may choose the route R_2 to avoid the obstacle 405.

Figure 5:
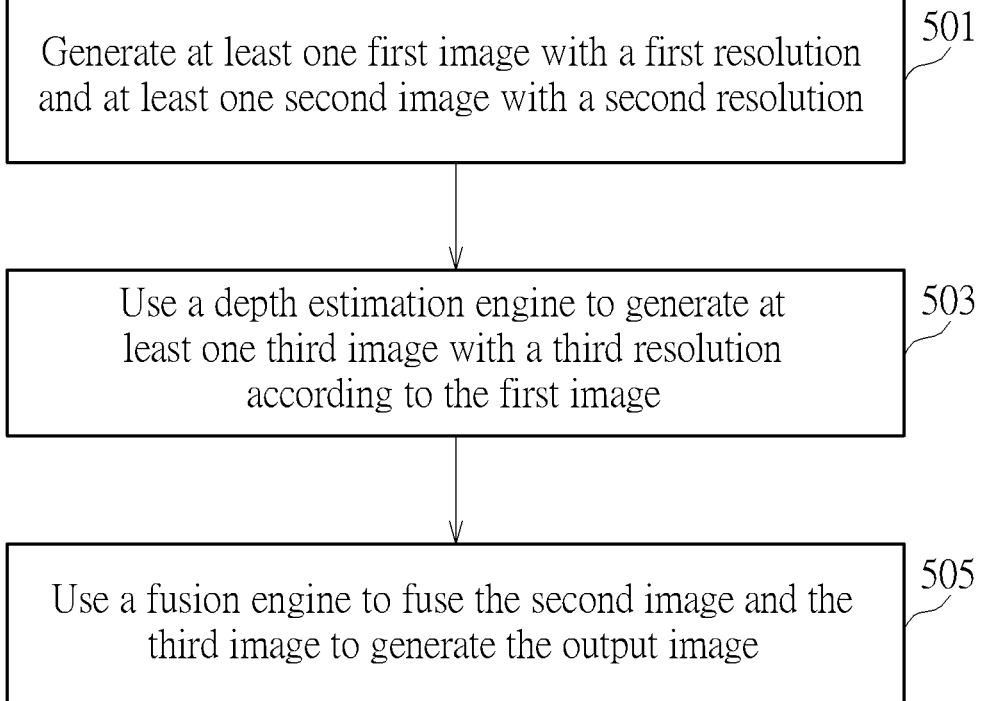
FIG. 5 is a flow chart illustrating an image generation method according to one embodiment of the present invention.

In view of the above-mentioned embodiments, an image generation method can be acquired. FIG. 5 is a flow chart illustrating an image generation method according to one embodiment of the present invention.

FIG. 5 comprises following steps:

Step 501

Generate at least one first image (e.g., Img_1 in FIG. 1 and FIG. 2) with a first resolution and at least one second image (e.g., Img_2 in FIG. 1 and FIG. 2) with a second resolution.

The first image does not have depth information and the second image has second absolute depth information. Also, the first resolution is higher than the second resolution.

Step 503

Use a depth estimation engine to generate at least one third image (e.g., Img_3 in FIG. 1 and FIG. 2) with a third resolution according to the first image.

The third image has relative depth information.

Step 505

Use a fusion engine to fuse the second image and the third image to generate the output image (e.g., Img_O in FIG. 1 and FIG. 2).

The output image has first absolute depth information.

In one embodiment, the third resolution is higher than the second resolution. Also, in one embodiment, an output resolution of the output image is higher than the second resolution, and the output resolution may be equal to the third resolution.

In view above-mentioned embodiments, the distance determination can keep accurate while the computation effort and cost of images with absolute depth information are reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image generation device, for generating an output image with first absolute depth information, comprising:

at least one image sensor, configured to generate at least one first image with a first resolution and at least one second image with a second resolution, wherein the first image does not have depth information and the second image has second absolute depth information, wherein the first resolution is higher than the second resolution; and a processing circuit, configured to use a depth estimation engine to generate at least one third image with a third resolution according to the first image, wherein the third image has relative depth information, wherein the depth estimation engine uses deep-learning based monocular depth estimation;

wherein the processing circuit further uses a fusion engine to fuse the second image and the third image to generate the output image.

2. The image generation device of claim 1, wherein the third resolution is higher than the second resolution.

3. The image generation device of claim 1, wherein an output resolution of the output image is higher than the second resolution.

4. The image generation device of claim 3, wherein the output resolution is equal to the third resolution.

5. The image generation device of claim 1, wherein a first frame rate of the first image is higher than a second frame rate of the second image.

6. The image generation device of claim 1, wherein a third frame rate of the third image is higher than a second frame rate of the second image.

7. The image generation device of claim 6, wherein the third frame rate is lower than a first frame rate of the first image.

8. The image generation device of claim 1, wherein an output frame rate of the output image is lower than a third frame rate of the third image, wherein the output frame rate is lower than or equal to a second frame rate of the second image.

9. An autonomous cleaner, comprising:

an image generation device, for generating an output image with first absolute depth information, comprising:

at least one image sensor, configured to generate at least one first image with a first resolution and at least one second image with a second resolution, wherein the first image does not have depth information and the second image has second absolute depth information, wherein the first resolution is higher than the second resolution; and a processing circuit, configured to use a depth estimation engine to generate at least one third image with a third resolution according to the first image, wherein the third image has relative depth information, wherein the depth estimation engine uses deep-learning based monocular depth estimation;

wherein the processing circuit further uses a fusion engine to fuse the second image and the third image to generate the output image; and a control circuit, configured to control operations of the autonomous cleaner according to the first absolute depth information.

10. The autonomous cleaner of claim 9, wherein the third resolution is higher than the second resolution.

11. The autonomous cleaner of claim 9, wherein an output resolution of the output image is higher than the second resolution.

12. The autonomous cleaner of claim 11, wherein the output resolution is equal to the third resolution.

13. The autonomous cleaner of claim 9, wherein a first frame rate of the first image is higher than a second frame rate of the second image.

14. The autonomous cleaner of claim 9, wherein a third frame rate of the third image is higher than a second frame rate of the second image.

15. The autonomous cleaner of claim 14, wherein the third frame rate is lower than a first frame rate of the first image.

16. The autonomous cleaner of claim 9, wherein an output frame rate of the output image is lower than a third frame rate of the third image, wherein the output frame rate is lower than or equal to a second frame rate of the second image.

17. An image generation method, for generating an output image with first absolute depth information, comprising:

generating at least one first image with a first resolution and at least one second image with a second resolution, wherein the first image does not have depth information and the second image has second absolute depth information, wherein the first resolution is higher than the second resolution;

using a depth estimation engine to generate at least one third image with a third resolution according to the first image, wherein the third image has relative depth information, wherein the depth estimation engine uses deep-learning based monocular depth estimation; and using a fusion engine to fuse the second image and the third image to generate the output image.

18. The image generation method of claim 17, wherein the third resolution is higher than the second resolution.

19. The image generation method of claim 17, wherein an output resolution of the output image is higher than the second resolution.

20. The image generation method of claim 19, wherein the output resolution is equal to the third resolution.

* * * * *